(12) United States Patent
Daily et al.

(10) Patent No.: US 6,550,963 B2
(45) Date of Patent: Apr. 22, 2003

(54) MULTIPOINT THERMOCOUPLE

(75) Inventors: Jeffrey N. Daily, Houston, TX (US); Robert F. Poteet, Sugarland, TX (US); Michael W. Rahn, Houston, TX (US); Larry D. Welch, Missouri City, TX (US)

(73) Assignee: Daily Instruments, Houston, TX (US)

( * ) Notice: Subject to any disclaimer, the term of this patent is extended or adjusted under 35 U.S.C. 154(b) by 0 days.

(21) Appl. No.: 09/842,905

(22) Filed: Apr. 26, 2001

(65) Prior Publication Data

US 2003/0016730 A1 Jan. 23, 2003

(51) Int. Cl.[7] .......................... G01K 7/04; H01L 35/12; H01L 35/08; H01L 35/32
(52) U.S. Cl. .................... 374/179; 374/166; 136/201; 136/211; 136/233; 136/236.1
(58) Field of Search ................ 374/179, 166, 374/137, 208, 158; 136/201, 211, 230, 232, 233, 236.1–241

(56) References Cited

U.S. PATENT DOCUMENTS

| | | | | |
|---|---|---|---|---|
| 721,770 A | * | 3/1903 | Zeleny | 374/166 |
| 1,224,385 A | * | 5/1917 | Kennedy | 374/166 |
| 1,263,308 A | * | 4/1918 | Bristol | 374/166 |
| 3,015,954 A | * | 1/1962 | Daiglish | 136/211 |
| 3,596,518 A | * | 8/1971 | Kirkpatrick | 374/166 |
| 3,653,262 A | * | 4/1972 | Ehrenfried et al. | 374/166 |
| 4,075,036 A | * | 2/1978 | Lysikov et al. | 374/179 |
| 4,148,134 A | * | 4/1979 | Metz | 136/233 |
| 4,176,554 A | * | 12/1979 | Kazmierowicz | 374/137 |
| 4,313,792 A | * | 2/1982 | Smith | 374/247 |
| 4,440,509 A | * | 4/1984 | Agarwal | 374/166 |
| 4,499,330 A | * | 2/1985 | Pustell | 374/208 |
| 4,653,935 A | | 3/1987 | Daily et al. | 374/110 |
| 4,725,399 A | * | 2/1988 | McCulloch et al. | 374/208 |
| 4,848,927 A | | 7/1989 | Daily et al. | 374/208 |
| 5,064,506 A | * | 11/1991 | Sparenberg et al. | 374/166 |
| 5,108,192 A | * | 4/1992 | Mailliet et al. | 374/166 |
| 5,192,132 A | * | 3/1993 | Pelensky | 374/166 |
| 5,228,114 A | * | 7/1993 | Suzuki | 374/166 |
| 5,232,517 A | | 8/1993 | Hilborn et al. | 136/233 |
| 5,772,329 A | * | 6/1998 | Bardon et al. | 374/166 |
| 5,775,807 A | | 7/1998 | Dutcher | 374/143 |
| 5,812,588 A | * | 9/1998 | Deak et al. | 374/166 |
| 6,431,750 B1 | * | 8/2002 | Haberbusch et al. | 374/166 |

FOREIGN PATENT DOCUMENTS

WO 9737391 A1 * 10/1997

OTHER PUBLICATIONS

Brochure, Ceramo (R) metal sheatged ceramic insulated thermocouple elements and Ceramocouples(R), Thermo–Electric Co., Inc., Saddle Brook, New Jersey, pages, (1965).*

W.S. application Ser. No. 09/842,932 Daily et al. filed Apr. 26, 2001.

* cited by examiner

Primary Examiner—Christopher W. Fulton
Assistant Examiner—Stanley J. Pruchnic, Jr.
(74) Attorney, Agent, or Firm—Fletcher, Yoder & Van Someren

(57) ABSTRACT

A multipoint thermocouple for sensing temperature. The thermocouple comprises a sheath having a plurality of conductor pairs disposed within the sheath. Each conductor pair has two conductors of dissimilar materials joined at a unique junction point along the sheath. The unique junction points permit sensing of temperature at different locations along the length of the multipoint thermocouple.

10 Claims, 6 Drawing Sheets

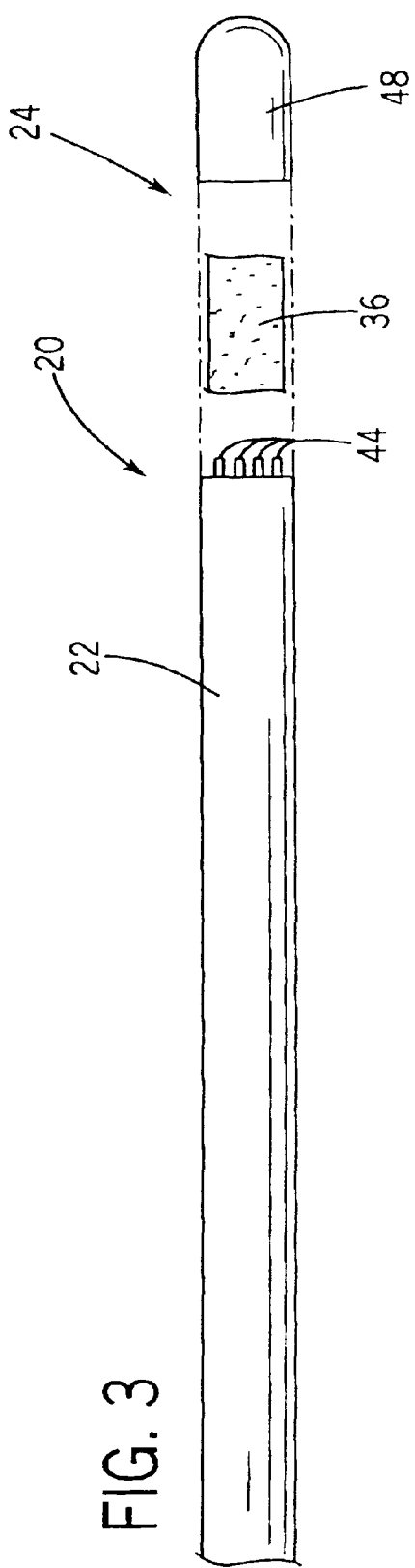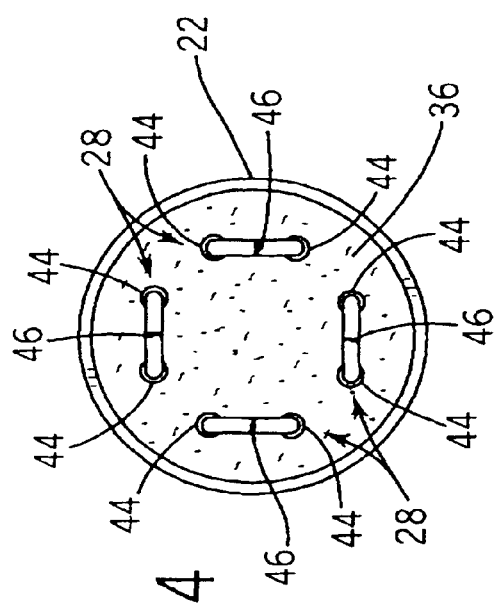

MULTIPOINT THERMOCOUPLE

FIELD OF THE INVENTION

The present invention relates generally to sensing temperature, and particularly to thermocouples designed to sense temperature at multiple points.

BACKGROUND OF THE INVENTION

Thermocouples are used in a variety of applications to sense temperature at a given location. A typical thermocouple comprises an external sheath and a pair of rod-shaped conductors disposed longitudinally within the sheath. Each conductor is of a dissimilar metallic material, and the two conductors are joined at a distal end within the sheath. An electrical insulation material also is packed about the rods within the sheath. The free ends of the conductors are connected to a detection instrument, such as a voltmeter, that measures the difference in potential created at the junction of the two metals. This difference in potential changes with temperature, thereby readily permitting the accurate detection of temperature at the junction point.

SUMMARY OF THE INVENTION

The present invention relates generally to a multipoint thermocouple system. One exemplary embodiment of the system comprises a sheath. Within the sheath, a plurality of conductor pairs are disposed. Each conductor pair comprises two conductors of dissimilar materials that are joined at a junction point. Each pair is designed such that its junction point is at a unique longitudinal location along the sheath. Thus, a multipoint thermocouple with a single sheath can be utilized to sense temperature at a plurality of distinct locations. The conductor pairs are electrically separated by an electrical insulation material disposed about the conductor pairs within the sheath. The invention also relates to a methodology for sensing temperatures at a variety of locations via a multipoint thermocouple.

BRIEF DESCRIPTION OF THE DRAWINGS

The invention will hereafter be described with reference to the accompanying drawings, wherein like reference numerals denote like elements, and:

FIG. 3 is a side view of the thermocouple illustrated in FIG. 1 with an end cap of the sheath exploded from the remainder of the sheath;

FIG. 4 is an end view taken of the exposed conductor pair ends shown in FIG. 3;

DETAILED DESCRIPTION OF EXEMPLARY EMBODIMENTS

Figure 1:
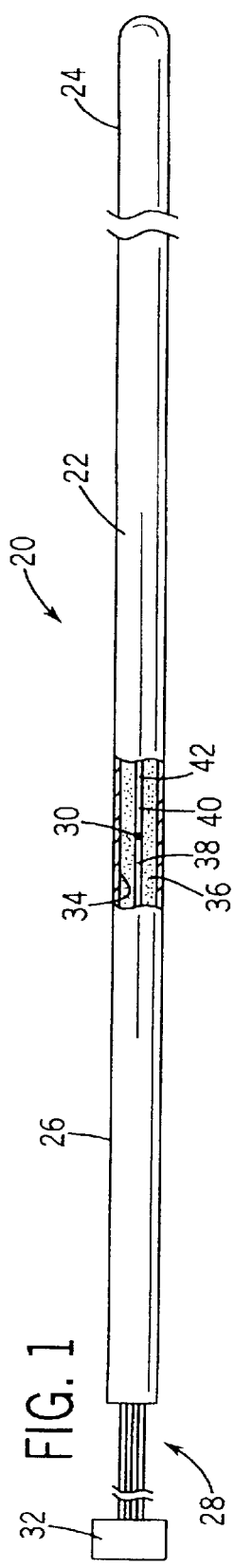
FIG. 1 is a side view of an exemplary, multipoint thermocouple, according to one embodiment of the present invention.

Referring generally to FIG. 1, an exemplary thermocouple system 20 is illustrated according to one embodiment of the present invention. Thermocouple system 20 comprises a sheath 22 having an enclosed distal end 24 and an opposed end 26 from which a plurality of conductor pairs 28 extend. Each conductor pair comprises a pair of conductors of dissimilar materials, typically metals, that are joined at a junction point 30. For example, the dissimilar conductors may be welded together to form the junction. The free ends of the conductor pairs 28 are connected to instrumentation 32, e.g. a voltmeter, that measures the difference in potential created at the junction of the two metals. This difference in potential corresponds to a given temperature.

Sheath 22 typically comprises an open interior 34 into which conductor pairs 28 extend. Within interior 34, an insulation material 36, such as an electrical insulation material, is disposed about the individual conductors of conductor pairs 28. In the illustrated embodiment, insulation material 36 generally fills interior 34 about conductor pairs 28. Although various electrical insulation materials may be used, an exemplary material comprises magnesium oxide (MgO).

Figure 2:
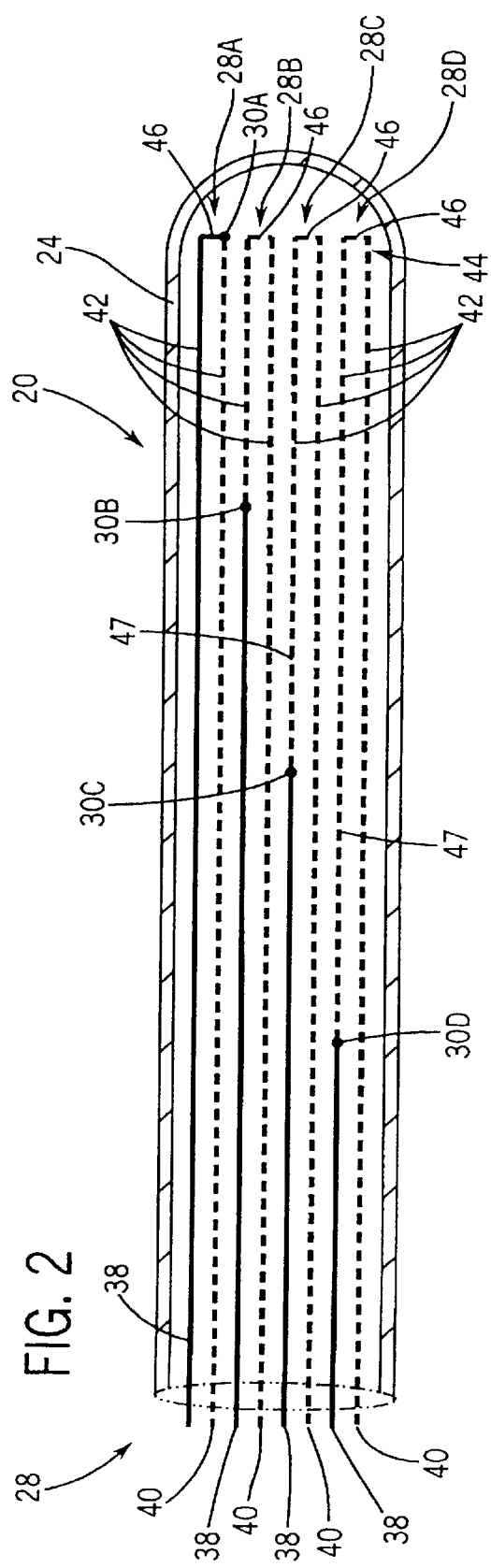
FIG. 2 is a schematic, cross-sectional view of a multipoint thermocouple, according to the present invention.

As illustrated best in FIG. 2, temperature may be determined at a plurality of locations along the length of sheath 22 by forming junction points at selected locations along the sheath. By way of example, the embodiment of FIG. 2 illustrates four conductor pairs 28A, 28B, 28C and 28D each having its own unique junction point 30A, 30B, 30C and 30D, respectively. The junction points 30A–30D are formed at unique longitudinal locations along sheath 22 to permit the sensing of temperature at those unique locations. It should be noted that four conductor pairs are illustrated for purposes of explanation and that various numbers of conductor pairs can be utilized. For example, two conductor pairs, three conductor pairs or even up to ten conductor pairs or more can be utilized within sheath 22 depending on space constraints and the desired application.

Each conductor pair comprises a first conductor 38 illustrated in solid line and a second conductor 40 illustrated in dashed line in FIG. 2. The first conductor 38 and the second conductor 40 of each conductor pair 28 are made of dissimilar conductive materials. Typically, the thermocouple calibration or type is established by the National Institute of Science and Technology, e.g. J, K, T, E, R or S. The various types typically utilize pairs of dissimilar metallic materials. The following chart provides some examples:

| Thermocouple Calibration | B&S Wire Gauge | Recommended Temperature Limits F | Thermocouple Material w/Identifying Characteristics | |
|---|---|---|---|---|
| | | | Positive | Negative |
| Type J | 8 ga. (.128") | 0 to 1400 | Iron | Con- |
| | 14 ga. (.064") | 0 to 1100 | (Magnetic) | stantant ™ |
| | 20 ga. (.032") | 0 to 900 | | |
| | 24 ga. (.020") | 0 to 700 | | |

-continued

| Thermo-couple Calibration | B&S Wire Gauge | Recommended Temperature Limits F | Thermocouple Material w/Identifying Characteristics | |
|---|---|---|---|---|
| | | | Positive | Negative |
| Type K | 8 ga. (.128")  | 0 to 2300 | Chromel ™ | Alumel ™ |
| | 14 ga. (.064") | 0 to 2000 | | (Magnetic) |
| | 20 ga. (.032") | 0 to 1800 | | |
| | 24 ga. (.020") | 0 to 1600 | | |
| Type T | 14 ga. (.064") | −300 to +700 | Copper | Constantan ™ |
| | 20 ga. (.032") | −300 to +500 | (Copper Color) | |
| | 24 ga. (.020") | −300 to +400 | | |
| Type E | 8 ga. (.128")  | −300 to +1600 | Chromel ™ | Constantan ™ |
| | 14 ga. (.064") | −300 to +1400 | | (Silver Color) |
| | 20 ga. (.032") | −300 to +1200 | | |
| Type R or Type S | 24 ga. (.020") | to 2700 | Platinum 13 Rh Platinum 10 Rh | Platinum Platinum (Softer than Pt Rh) |

Additionally, various combinations of different conductor pair types can be utilized within a single sheath 22. A variety of materials also may be used to form sheath 22. For example, stainless steel and Inconel™ are appropriate for use in a variety of applications.

Although a variety of techniques may be used to join the dissimilar conductors at desired junction points 30 within sheath 22, one technique is to provide conductor pairs 28 by forming a plurality of rods 42 that extend into sheath 22 to distal end 24, as further illustrated in FIGS. 3 and 4. The rods 42 are preformed of the material of first conductor 38, second conductor 40 or a combination of the two. In FIG. 2, for example, four rods 42 are formed of the material of second conductor 40, one rod is formed of the first conductor material 38 and three rods are formed of a combination of first conductor material and second conductor material that are joined at the desired junction point, e.g. 30B, 30C and 30D. When the rods are placed within sheath 22, the junction points 30A–30D are disposed at desired locations for sensing temperature.

Each of the rods 42 has a distal rod end 44, and the appropriate pairs of rod ends are joined together to form conductor pairs 28, as best illustrated in FIGS. 3 and 4. Although distal rod ends 44 may be joined in a variety of ways, the distal rod ends may be fused, e.g. welded, together at a fusion end 46. Alternatively, a cross piece or cross rod may be utilized. For example, a cross piece formed of the appropriate conductor material may be welded or otherwise joined to corresponding rod ends. When joined, at least some of the conductors comprise a return segment 47 (see FIG. 2) that returns the conductor from the distal end to a junction point 30, e.g. 30B, 30C, 30D, within sheath 22.

Although various processes may be used to form thermocouple system 20, one exemplary methodology comprises preparing those rods 42 with two dissimilar materials by, for example, welding the dissimilar conducting materials together at predetermined points. The combination rods 42 along with the remaining rods 42 are then passed through insulation 36 within the open ended sheath 22 (see FIG. 3) Insulation 36 may initially be placed within sheath 22 in the form of beads. Sheath 22 is then swaged to compact the insulation 36 and sheath 22.

Following swaging, the insulation, e.g. MgO, is removed at distal end 24 and the appropriate rods are coupled to form conductor pairs 28, as best illustrated in FIG. 4. For example, cross pieces 46 may be welded across appropriate rod ends 44. An appropriate insulation material, such as magnesium oxide powder, is placed around the protruding rod ends (see FIG. 3) and a sheath cap 48 is attached to the remainder of the sheath by, for example, welding.

Figure 5:
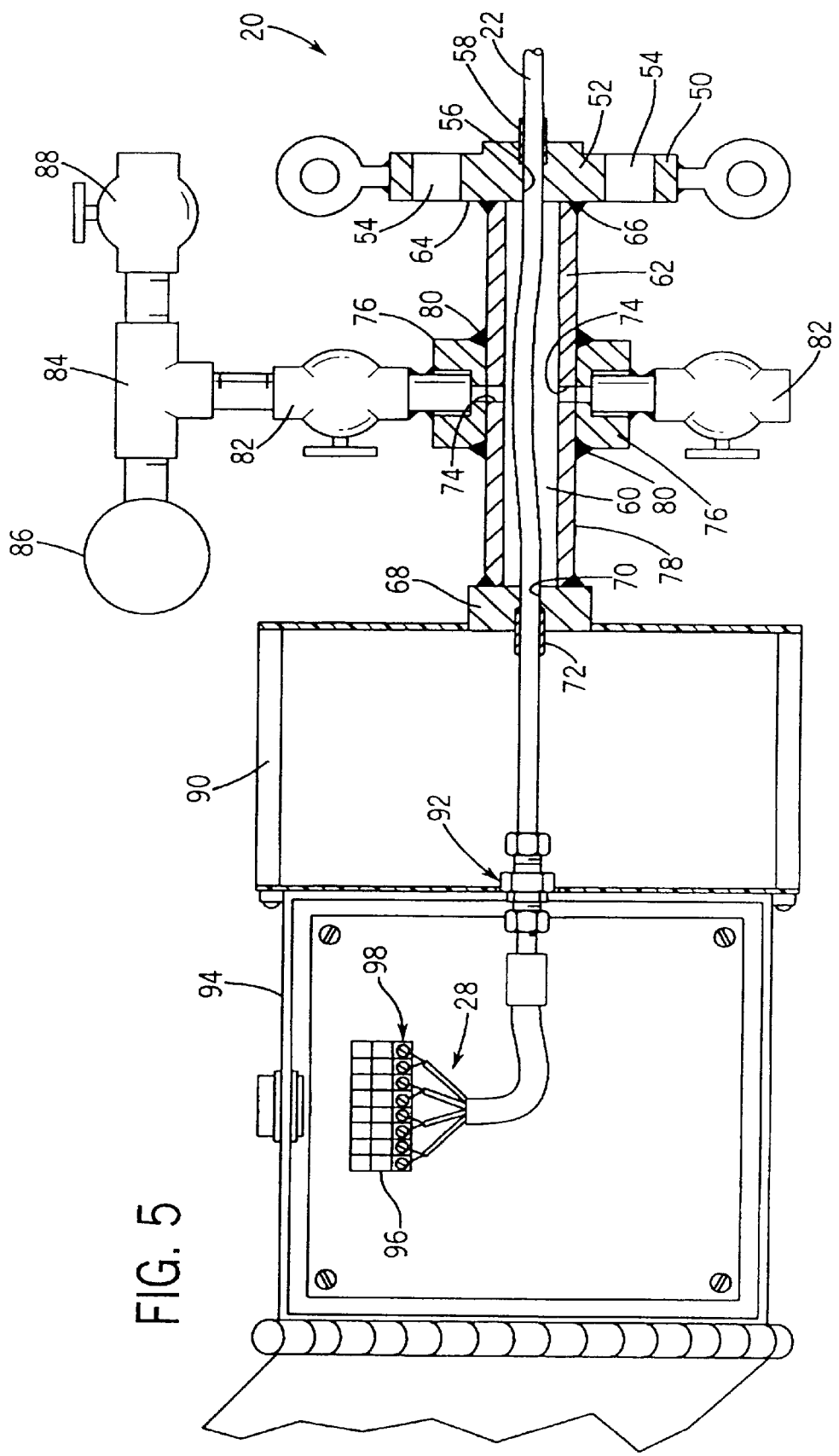
FIG. 5 illustrates an exemplary application of the thermocouple of FIG. 1.

Thermocouple system 20 is readily designed for a variety of applications. For example, one exemplary application utilizes thermocouple system 20 for sensing temperature at a plurality of locations within an enclosed environment, such as a tank. In the embodiment illustrated in FIG. 5 , the thermocouple system further comprises a mounting system 50 designed for attachment to a corresponding flange of a tank (described more fully below). Mounting system 50 comprises a plate 52 having a plurality of apertures 54 utilized in fastening plate 52 to the corresponding flange by, for example, threaded fasteners. Mounting system 50 further includes an opening or openings 56 through which sheath 22 passes into the container. Sheath 22 is sealed to plate 52 at its corresponding opening 56 by, for instance, a socket weld 58.

In the illustrated embodiment, a containment chamber 60 is formed by a containment wall 62 connected to a back surface 64 of plate 52. Containment wall 62 is connected to plate 52 by, for example, a weld 66. At an end opposite plate 52, containment chamber 60 is enclosed by a plate 68 having one or more plate openings 70 through which one or more sheaths 22 extend. Each sheath is sealed within its corresponding opening 70 by, for example, a socket weld 72.

Containment wall 62 also may include one or more openings 74 that provide selective access to the containment chamber. For example, in the illustrated embodiment, a pair of bosses 76 are attached to an exterior surface 78 of containment wall 62 proximate openings 74. The bosses 76 may be attached to containment wall 62 by appropriate welds 80.

Each boss 76 is designed to receive an appropriate instrument, e.g. a valve 82. In the illustrated embodiment, one of the valves 82 is coupled to a T-section 84 which, in turn, is coupled to a pressure gauge 86 and an additional valve 88. In this exemplary embodiment, the pressure gauge 86 is attached to determine whether any high pressure fluid leaks into containment chamber 60, as described in more detail below. Depending on the application, a variety of instruments may be coupled to containment chamber 60.

From containment chamber 60, sheath 22 extends through a support bracket 90 to which it is attached by appropriate fasteners 92, e.g. a bulk head connector. Subsequent to fastener 92, sheath 22 extends to a junction box 94 having a terminal block 96. The various conductor pairs 28 a re coupled to appropriate terminals 98 of terminal block 96. The terminal block may be connected to appropriate instrumentation, such as instrumentation 32, to determine the various potential differences, and thereby the temperatures, at each of the junction points 30.

Figure 6:
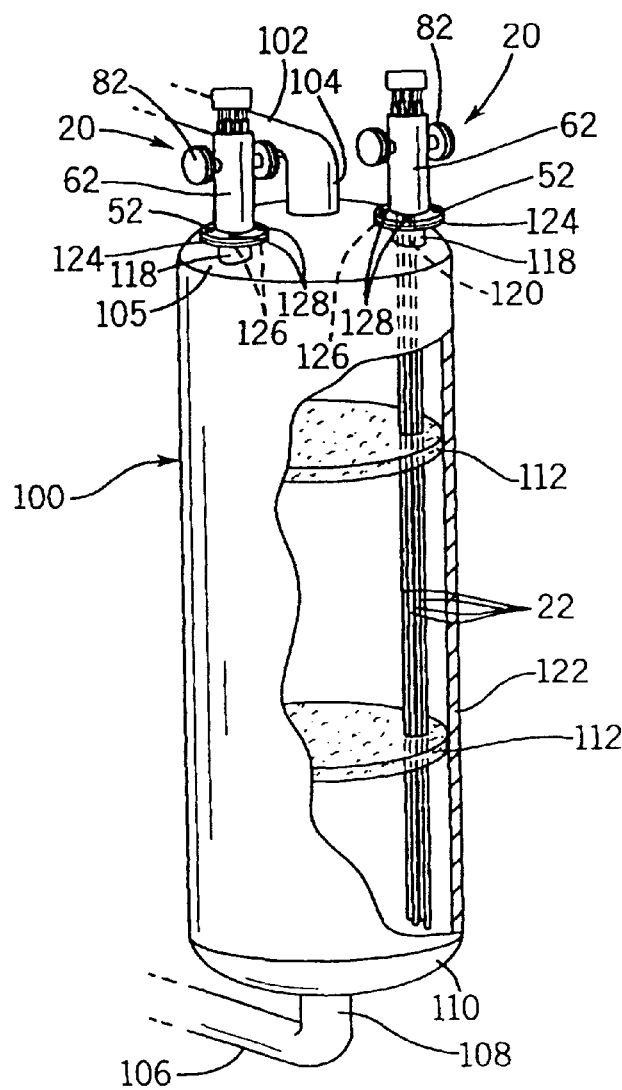
FIG. 6 illustrates a high pressure reaction vessel combined with a thermocouple, according to an exemplary embodiment of the present invention.
Figure 7:
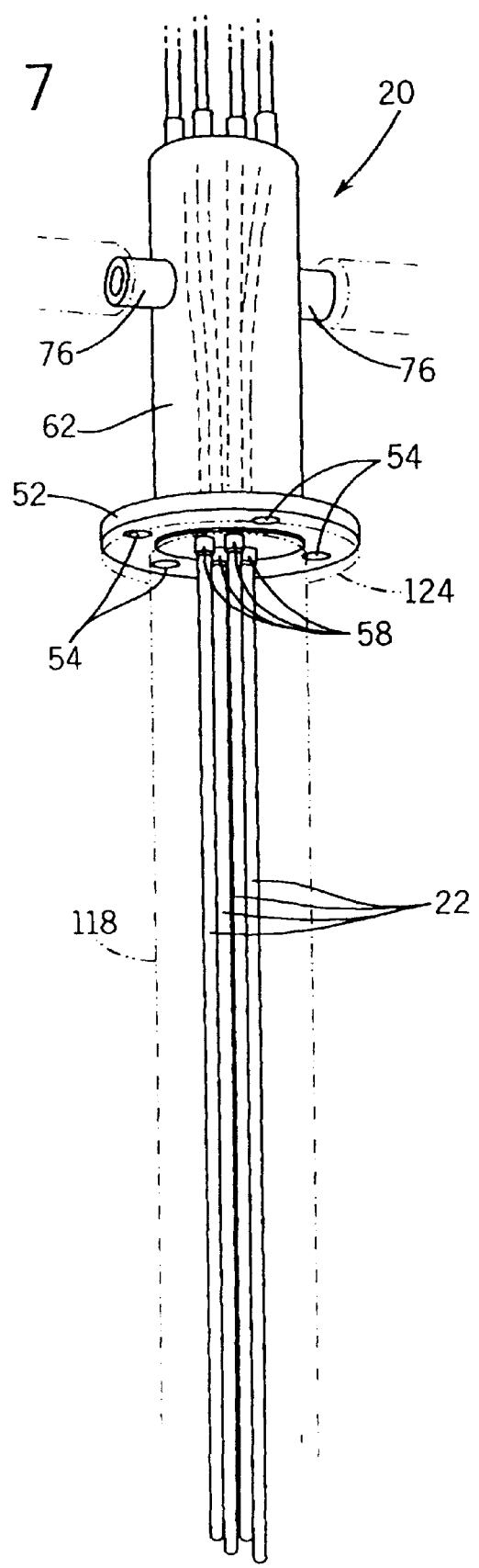
FIG. 7 illustrates an exemplary alternate embodiment of the multipoint thermocouple for use in a variety of applications.

Referring generally to FIGS. 6 and 7, a specific application of an alternate thermocouple system is illustrated. In this embodiment, a high pressure chemical reaction vessel 100 is designed for a desired chemical process. For example, high pressure vessel 100 may be utilized in the petroleum industry and may comprise a hydrocracker, a hydrotreater, a hydrogen reactor, a catalytic reactor, a catalytic cracker or an ethylene oxide reactor. Vessel 100 also may be utilized with weld pad or tube skin applications. In an exemplary application, one or more high pressure chemical reaction vessels 100 are coupled to a manifold pipe 102 by a connector pipe 104. Connector pipe 104 is disposed in fluid communication with the interior of vessel 100 generally at an upper portion 105 of vessel 100. Similarly, a second manifold pipe 106 is coupled to the one or more vessels 100 by an appropriate lower connector pipe 108. Lower connector pipe 108 generally is connected in fluid communication with vessel 100 at a lower or bottom portion 110. Manifold pipe 102 and second manifold pipe 106 can be used to provide ingress or egress of fluids moving to or from high pressure chemical reaction vessel or vessels 100.

In a petrochemical application, petrochemicals move into high pressure chemical reaction vessels 100 in either direction depending on the specific application. For example, flow can be from manifold pipe 102 downward through vessel 100 and out through second manifold pipe 106. Alternatively, the flow can be in the reverse direction moving from second manifold pipe 106 upwardly through vessels 100 to manifold pipe 102.

Typically, one or more beds 112 are deployed within high pressure chemical reaction vessel 100 at various levels. The number and type of beds vary according to the environment and the types of high pressure and high temperature reactions that take place within the reactor, e.g. high pressure chemical reaction vessel 100, for a given application. To sense the reaction temperature at different levels and to control the proper reaction rate, temperature is sensed at various selected levels within vessel 100.

One or more thermocouple systems 20 are deployed to extend downwardly into the interior of vessel 100 for sensing temperature at a plurality of longitudinal locations within the pressure vessel. It should be noted that one or more systems 20 also can be deployed from the side (e.g. horizontally) and/or from the bottom of vessel 100. As described above, sheath 22 encloses a plurality of conductor pairs 28 designed to sense temperature at a plurality of unique, longitudinal positions along the sheath. However, additional sheaths can be designed to extend into pressure vessel 100 to provide an even greater number of sensing points for detecting temperature within vessel 100. For example, the embodiment illustrated best in FIG. 7 shows four sheaths extending downwardly from mounting plate 52. Each sheath 22 may enclose a plurality of conductor pairs 28, as described with reference to FIGS. 1–4.

The use of multiple thermocouples in each sheath facilitates the use of numerous thermocouples with a minimal number of welds at mounting plate/flange 52. For example, the embodiment illustrated in FIG. 7 only requires four welds about the four sheaths 22, while multiple thermocouples may be deployed in each sheath. This is advantageous over prior art designs where each thermocouple had its own sheath requiring a separate weld. In many such applications, the relatively large number of welds could not be accommodated at the flange.

The number of conductor pairs 28 within each sheath and the number of sheaths utilized can be adjusted according to application and design parameters. For example, a single sheath may be able to contain sufficient conductor pairs 28 to provide temperature sensing capability at all of the desired locations, or the temperature sensing junctions can be divided between additional sheaths. Also, the use of additional sheaths that each contain one or more conductor pairs 28 permits those sheaths to be bent, curled, arced or otherwise formed to sense temperatures at a variety of other locations within the vessel 100.

Figure 8:
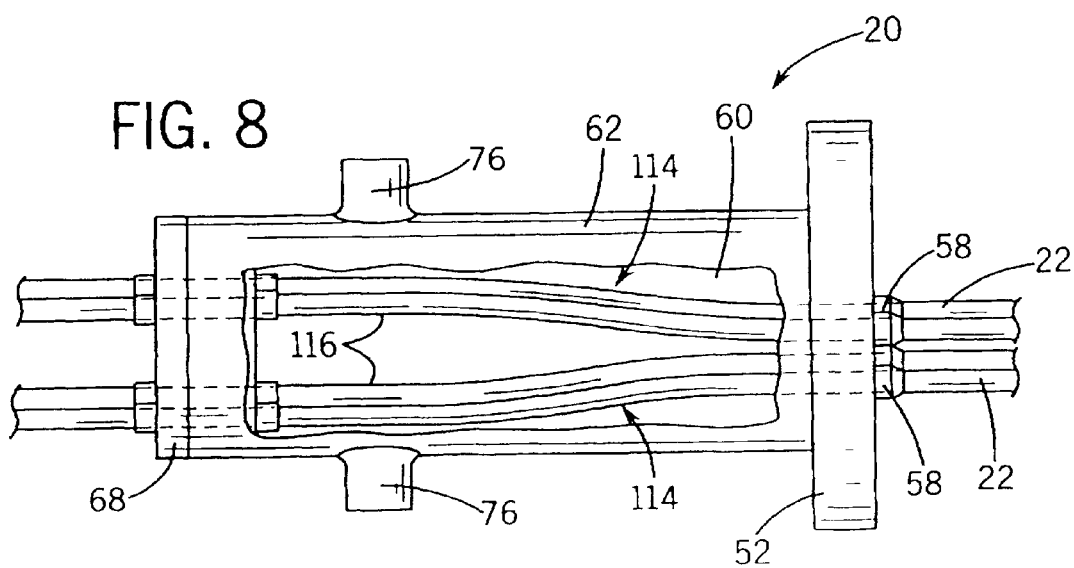
FIG. 8 is partially cut-away view of a containment chamber utilized with the thermocouple of FIG. 7.

As illustrated best in FIG. 8, the one or more sheaths 22 preferably include a relief section 114 disposed within containment chamber 60 to facilitate flexing of the sheath due to for example, thermal expansion. The relief section 114 of each sheath may comprise an arcuate section 116 that provides the sheath with sufficient flexibility.

Depending on the application and type of vessel 100 utilized in the application, the attachment of thermocouple system 20 to pressure vessel 100 may vary. However, one exemplary embodiment utilizes a neck 118 fastened to vessel 100 by, for example, a weldment. Neck 118 is deployed around an opening 120 formed through the outer wall 122 of vessel 100. A flange 124 is connected to an upper end of neck 118 to facilitate mounting of thermocouple system 20. Flange 124 typically is welded to neck 118. If additional thermocouple systems 20 are utilized for a given application, a plurality of necks and flanges may be coupled to the pressure vessel as described.

Flange 124 may include a plurality of apertures 126 configured for alignment with apertures 54 of mounting plate 52. Appropriate fasteners 128, such as bolts, can be inserted through apertures 54 and 126 to secure each thermocouple system 20 to the appropriate high pressure chemical reaction vessel 100. As illustrated, the sheath or sheaths 22 simply are inserted into the interior of vessel 100 via neck 118, and plate 52 is secured to flange 124. Additionally, appropriate seals can be utilized intermediate flange 124 and plate 52 to prevent escape of high pressure fluids, depending on a particular application, and as known to those of ordinary skill in the art. It should be noted that numerous types of flanges and other connectors can be utilized in coupling each thermocouple system 20 to a given high pressure chemical reaction vessel.

Figure 9:
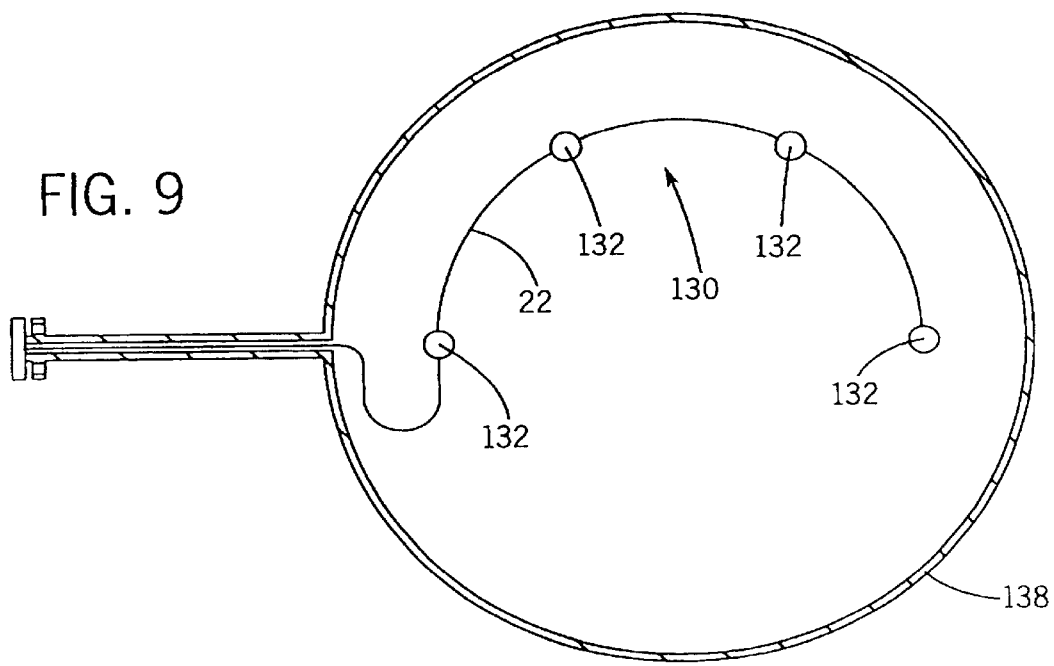
FIG. 9 is a schematic illustration of the application of an exemplary thermocouple to sense temperature at a variety of locations or points within a chamber.

The use of multiple conductor pairs able to sense temperature at a plurality of unique locations within a single sheath permits great flexibility in the design of the thermocouple. For example, the sheath may be formed along a contour 130, as illustrated in FIG. 9. The multiple conductor pairs 28 having junction points 30 separated longitudinally along the sheath 22 permits detection of temperature at a plurality of unique locations 132 along contour 130. Thus, the temperature detection points are not necessarily disposed linearly along a relatively straight sheath.

Figure 10:
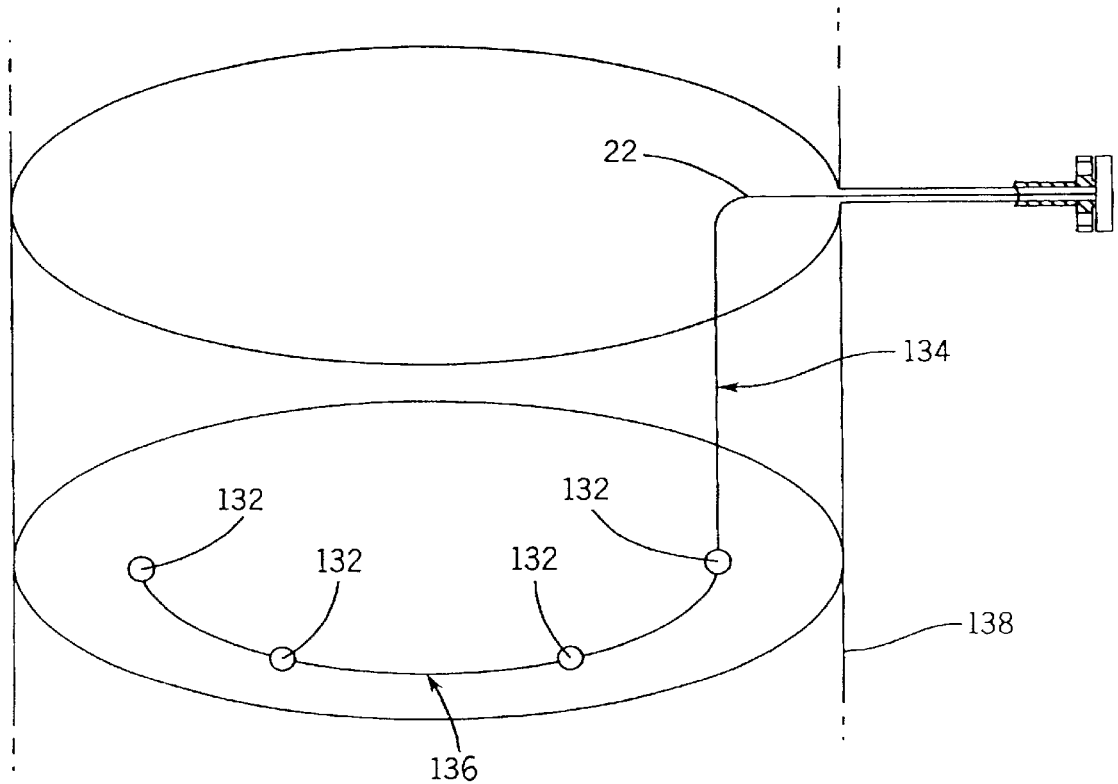
FIG. 10 is a schematic illustration showing another exemplary configuration of the thermocouple illustrated in FIG. 9.

The contour 130 illustrated in FIG. 9 is formed as an arc, however, contour 130 may comprise a variety of other shapes and arrangements. For example, the embodiment of FIG. 10 utilizes a sheath that is bent downwardly along a relatively straight contour 134 before transitioning into an arced contour 136. Contour 136 is deployed generally along the arcuate outer wall of a vessel 138, as illustrated in both FIGS. 9 and 10.

It will be understood that the foregoing description is of exemplary embodiments of this invention, and that the invention is not limited to the specific forms shown. For example, the materials utilized in forming the thermocouples may be adjusted according to changes in thermocouple design, advancement of material science, the environment of use, etc. Additionally, the multipoint thermocouples described can be utilized in a variety of applications that may require various mounting structures, support structures and instrumentation. Various applications may or may not require containment chambers, and a variety of vessels ranging from low pressure vessels to high pressure vessels may be utilized for the reaction and/or flow of a variety of substances. These and other modifications may be made in the design and arrangement of the elements without departing from the scope of the invention as expressed in the appended claims.

What is claimed is:

1. A temperature sensing device, comprising:
a sheath having an insulating material disposed therein;
a plurality of first conductors; and
a plurality of second conductors, the second conductors being formed of a different material than the first conductors, the first conductors being connected to corresponding second conductors within the insulating material at a plurality of unique longitudinal locations, wherein the insulating material fills the interstices between the plurality of first conductors and second conductors, wherein each of the plurality of first conductors comprises a rod that extends substantially along the entire length of the sheath.

2. The temperature sensing device as recited in claim 1, wherein the insulating material comprises magnesium oxide.

3. The temperature sensing device as recited in claim 1, wherein the sheath comprises a metal material.

4. The temperature sensing device as recited in claim 1, wherein the plurality of first conductors each comprise a type J material.

5. The temperature sensing device as recited in claim 1, wherein the plurality of first conductors each comprise a type K material.

6. The temperature sensing device as recited in claim 1, wherein the plurality of first conductors each comprise a type T material.

7. The temperature sensing device as recited in claim 1, wherein the plurality of first conductors each comprise a type R material.

8. The temperature sensing device as recited in claim 1, wherein the plurality of second conductors each comprise a type E material.

9. The temperature sensing device as recited in claim 1, wherein the plurality of second conductors each comprise a type K material.

10. The temperature sensing device as recited in claim 1, wherein the second conductors each comprise a type S material.

* * * * *